(12) United States Patent
Hamilton

(10) Patent No.: US 9,944,433 B2
(45) Date of Patent: Apr. 17, 2018

(54) FOOD AND BEVERAGE BOTTLE ASSEMBLY

(71) Applicant: Linwood F. Hamilton, Charleston, WV (US)

(72) Inventor: Linwood F. Hamilton, Charleston, WV (US)

(*) Notice: Subject to any disclaimer, the term of this patent is extended or adjusted under 35 U.S.C. 154(b) by 0 days.

(21) Appl. No.: 14/827,385

(22) Filed: Aug. 17, 2015

(65) Prior Publication Data

US 2017/0050762 A1    Feb. 23, 2017

(51) Int. Cl.
| | |
|---|---|
| *B65D 23/12* | (2006.01) |
| *B65D 1/02* | (2006.01) |
| *B65D 65/38* | (2006.01) |
| *A23G 1/30* | (2006.01) |
| *A23C 19/00* | (2006.01) |
| *C12G 1/00* | (2006.01) |

(52) U.S. Cl.
CPC ............ *B65D 23/12* (2013.01); *A23C 19/00* (2013.01); *A23G 1/30* (2013.01); *B65D 1/023* (2013.01); *B65D 65/38* (2013.01); *C12G 1/00* (2013.01); *A23V 2002/00* (2013.01)

(58) Field of Classification Search
CPC ......... B65D 23/12; B65D 1/023; B65D 65/38
USPC ............................................ 426/85, 115, 132
See application file for complete search history.

(56) References Cited

U.S. PATENT DOCUMENTS

| | | | | |
|---|---|---|---|---|
| 3,027,037 A * | 3/1962 | Bronson | ................. | A47G 19/06 215/386 |
| 4,635,291 A * | 1/1987 | Barton | ............... | B65D 21/0238 206/806 |
| 5,318,787 A * | 6/1994 | Brauner | ............. | B65D 21/0238 206/216 |
| 5,635,229 A * | 6/1997 | Ray | ........................ | B65D 23/12 206/205 |
| 6,565,899 B1 * | 5/2003 | Cecere | ..................... | A23G 3/50 426/132 |
| 7,214,397 B1 * | 5/2007 | Renna | .................... | A23G 3/563 426/104 |
| 2003/0170291 A1 * | 9/2003 | Landau | ................ | A61K 9/0095 424/439 |
| 2005/0123657 A1 * | 6/2005 | Beckman | ........... | B65D 21/0238 426/112 |
| 2006/0054583 A1 * | 3/2006 | Barbagli | ............ | B65D 21/0238 215/6 |
| 2006/0169355 A1 * | 8/2006 | Wong | ................. | B65D 21/0238 141/319 |
| 2008/0152766 A1 * | 6/2008 | Chan | ..................... | A23G 3/563 426/110 |
| 2016/0029849 A1 * | 2/2016 | Hartley | .................. | B65B 17/02 426/120 |

OTHER PUBLICATIONS

The History of the Doughnut, Smithsonian.com, Mar. 1998, [on line] retrieved on Dec. 27, 2016. Retrieved from the Internet: URL:<http://www.smithsonianmag.com/history/the-history-of-the-doughnut-150405177/?all>.*

* cited by examiner

*Primary Examiner* — Erik Kashnikow
*Assistant Examiner* — Chaim A Smith

(57) ABSTRACT

A food and beverage bottle assembly is described. A food collar is adapted to slip onto the neck of a beverage bottle to create and a food and beverage bottle assembly. The assembly is particularly useful for gifts or special occasions such that particular food and beverage combinations, such as wine and chocolate or cheese may be paired and assembled together in a unique assembly.

8 Claims, 2 Drawing Sheets

FOOD AND BEVERAGE BOTTLE ASSEMBLY

FIELD OF THE INVENTION

The present invention is directed to an edible food accessory that slides over the neck of a bottle to form a food and beverage bottle assembly.

SUMMARY OF THE INVENTION

Embodiment of the present invention may include a bottle collar comprising a collar body defining a throughbore extending therethrough wherein the collar body is adapted to slidably receive a neck of a beverage bottle, and wherein the collar body comprises a food composition. The food composition may include one or more foods such as chocolate, cheese, spreads, breads, cookies, hard candy, and fudge.

Additional embodiment of the invention may include a food and beverage bottle assembly comprising a beverage bottle comprising a body, a neck, and a shoulder connecting the body with the neck. In some embodiments, the diameter of the body is greater than the diameter of the neck. Additionally, the food and beverage bottle assembly includes a food collar comprising a collar body defining a throughbore extending therethrough that is slidably received over the neck of the beverage bottle and rests on the shoulder of the beverage bottle. The collar body comprises a food composition and the food composition may include one or more foods such as chocolate, cheese, spreads, breads, cookies, hard candy, and fudge.

DETAILED DESCRIPTION OF EMBODIMENTS OF THE INVENTION

Complimentary foods and beverages are often paired together to provide the consumer with an enhanced experience. For example, certain wines and particular cheeses or chocolate are often paired with one another at meals, social events, or special occasions. Typically, the bottle of wine and the food item are provided separately such as serving a bottle of wine and separately providing a tray with cheese or chocolate. For holidays or special occasions, wine is popular a gift. Less frequent is the giving of wine paired with a food item as a packaged gift. To provide a gift of wine and a food item such as chocolate or cheese would require selecting and providing two separate items, the bottle of wine and the food item as two separate and distinct items. The present invention provides a unique configuration and presentation in which a beverage bottle, such as a wine bottle, and food item may be paired together and assembled into a single unit or assembly.

Figure 1:
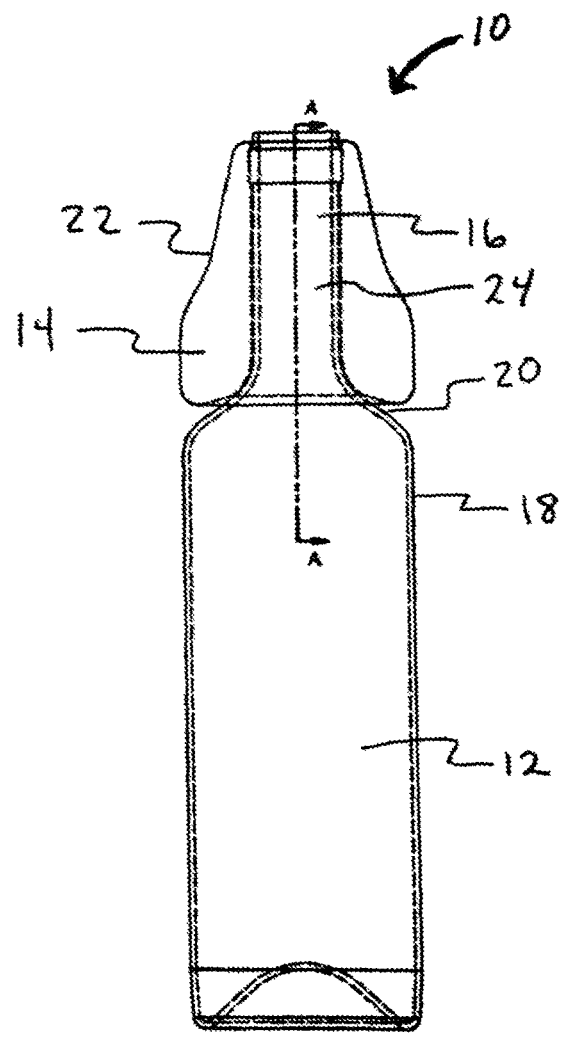
FIG. 1 is a side view of the food and beverage bottle assembly in accordance with an embodiment of the present invention.

With reference now to FIG. 1, there is shown a food and beverage bottle assembly 10 in accordance with an embodiment of the present invention. The food and beverage bottle assembly comprises a beverage bottle 12 and a removable food collar 14 that is slidably received on the beverage bottle 12. This configuration allows for a single presentation of the beverage bottle and food item. As will be discussed further below, a large combination of beverage bottles and different food collars maybe paired with one another depending upon the various flavors of the beverage and food and the desired combination by the consumer.

Turning to the details of the beverage bottle 12, the beverage bottle may be any typical beverage bottle used in the beverage industry. The beverage bottle 12 has a neck 16, a body 18, and a shoulder 20 connecting the body 18 of the bottle with the neck 16. The body 18 typically has a diameter, or a distance between opposing wall surfaces, that is greater than the diameter, or distance between opposing wall surfaces of the neck 16. The body 18 of the beverage bottle typically defines the volume that holds a majority of the liquid beverage. The shoulder 20 provides a transition from the body 18 of the bottle to the neck 16. The neck 16 typically has a diameter, or a distance between opposing walls, that is smaller than the diameter of the body 18 and provides a path for the beverage to exit the body of the bottle. While FIG. 1, illustrates a typical wine bottle with a general cylindrical body and cylindrical neck, the beverage bottle may take on or adopt a wide range of sizes and proportions. In certain embodiments it is preferable that the diameter, or distance between opposing walls of the neck is smaller than the diameter, or distance between opposing walls of the body. The material used for the beverage bottle is not particularly limited and may include, but is not limited to glass, plastic, clay or any other material suitable for carrying or storing beverages or liquids. While references have been made to wine and wine bottles, the present inventions contemplates virtually any beverage, including, but not limited to wine, beer, liquor, soft drinks, juices, milk, coffee, syrups or other consumable liquids.

Figure 2:
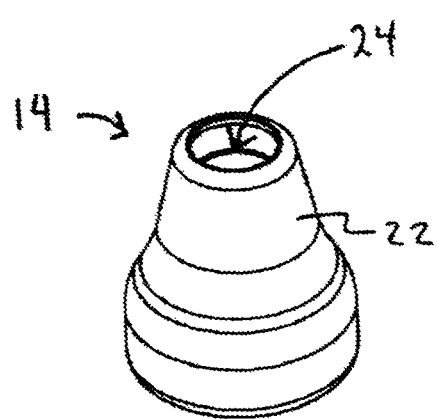
FIG. 2 is a diagrammatic representation of a food collar in accordance with an embodiment of the present invention.
Figure 3:
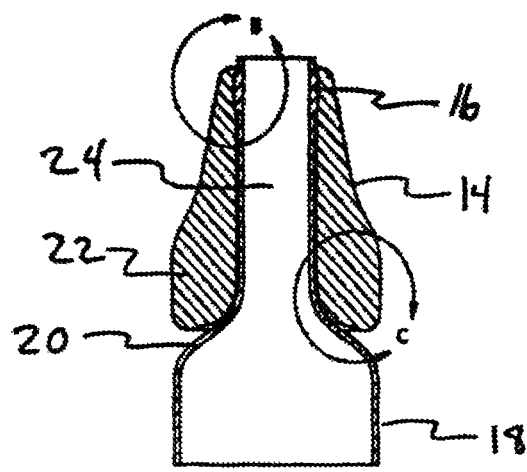
FIG. 3 is a cross-sectional view of the food and beverage bottle assembly from FIG. 2 taken along the line A-A.

With reference to FIGS. 2 and 3, and continuing reference to FIG. 1, there is illustrated a removable food collar 14 in accordance with certain embodiments of the invention. The size and configuration of the removable food collar 14 is adapted to slide over the neck of the beverage bottle and, in some embodiments, rest on the shoulder 20 of the beverage bottle 12. The food collar 14 includes a collar body 22. The collar body 22 defines a throughbore 24 extending through the collar body 22 and defining openings at opposing ends of the collar body 22. The diameter of the throughbore 24 is sized to slidably receive the neck 16 of the beverage bottle such that the food collar surrounds the neck of the beverage bottle. The length of the through bore is preferably less than the length of the neck of the bottle. In some embodiments, the collar body 22 is adapted to slide over the neck 12 and rest on the shoulder 20 of the beverage bottle as shown in FIG. 4b.

Figure 4A:
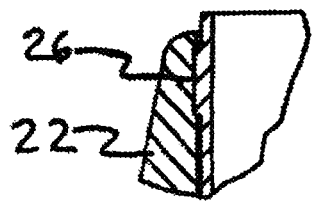
FIG. 4a is a close-up view of region B from FIG. 3 in accordance with an embodiment of the invention.
Figure 4B:
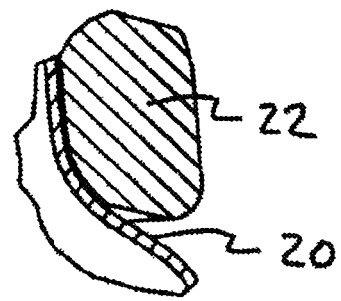
FIG. 4b is close-up view of region C from FIG. 3 in accordance with an embodiment of the invention.

With reference to FIG. 4a and continuing reference to FIG. 3, optionally, the food collar body 22 may include a groove 26 in the throughbore 24 that can engage with a lip on the beverage bottle. This can be an optional feature in some embodiments of the food collar 14 to assist in securing the food collar on the beverage bottle 12.

The shape of the food collar is not limited and may include a wide variety of shapes and sizes so long as the shape can accommodate the throughbore. For example, shapes may include but, are not limited to, spheres, cylinders, cubes, rectangular prisms, pyramids, multi-sided structures having greater than six sides, rings, combinations of one or more of these shapes, or other geometric shapes known to those skilled in the art. Still further, the shape of the food collar may also be formed to resemble shapes of natural or consumer objects such as a ball, bottle, vehicle, grapes, trees, animals, heads such as bust formations, monuments, organization mascots or symbols and other known objects. While the above-mentioned shapes provide a general representation of the wide variety of shapes for the food collar, the shape is only limited to those shapes that can accommodate a throughbore.

The outer surfaces collar body may be molded or decorated to provide one or more decorative features including but not limited to lettering, images, textures and other similar decorative features. The decorative features may be mold into the food collar body or provided as raised features on the outer surfaces of the collar body. Utilizing a combination of shapes and decorative features, the food collar may be customized for particular occasions to personalize or enhance the desirability of the food and beverage bottle assembly.

The food collar may include a protective packaging substantially covering the collar body. The protective packaging may protect the food composition from contamination. Further the protective packaging may help maintain the shape and configuration of the food collar, particularly for food compositions that are relatively soft or become soft at elevated temperatures. The protective packaging may be made from any suitable material known to those skilled in the art for packaging food and may include, but is not limited to foil, polymer film, wax paper, cardboard, paper, plastics, and other materials for packaging food compositions. Additionally, the protective packaging may include one or more graphical designs or colors. Using decorated protective packaging, various themes may be utilized to enhance the occasion or personalize the food and beverage bottle assembly for the desired occasion.

The food collar body comprises a food composition. The food composition is not particularly limited and may include, but is not limited to, chocolate, cheese, spreads, breads, cookies, hard candy, fudge, or other solid or semi-solid foods. Preferably, the food composition is solid at room temperature such that the food composition may be form into the desired shape with any desired ornamental features and can accommodate the throughbore without substantial sagging or deformation. In some embodiments, the food composition is solid at temperatures below about 78 F, or in preferred embodiments, from about 65 F to about 75 F.

Having described details of the beverage bottle and food collar above, these two components may be reversibly assembled into a food and beverage bottle assembly. A consumer selects a desired beverage contained in a beverage bottle. The consumer selects a food collar comprising a desired food composition to compliment or pair with the selected beverage bottle. Further, if there are a variety of food collars comprising the desired food composition that have different configurations such as different shapes, ornamental features or protective packaging, the consumer selects the desired food collar configuration to pair with the selected beverage. The selected food collar slides over the neck of the beverage bottle resting on the shoulder of the beverage bottle to form the desired food and beverage bottle assembly.

Having described various embodiments of the invention in detail above, the invention is limited only by the appended claims.

What is claimed is:

1. A food and beverage bottle assembly comprising:
   a beverage bottle comprising a body, a neck, a lip extending from the neck, and a shoulder connecting the body with the neck, wherein the diameter of the body is greater than the diameter of the neck;
   a food collar comprising a collar body defining a throughbore extending therethrough that is slidably received over the neck of the beverage bottle and resting on the shoulder of the beverage bottle and a groove adapted to engage the lip of the beverage bottle defined in collar body about the throughbore, wherein the food collar body comprises a food composition; and
   a protective packaging substantially covering the collar body.

2. The food and beverage bottle assembly of claim 1, wherein the collar body defines openings at opposing ends of the collar body.

3. The food and beverage bottle assembly of claim 1, wherein outer surfaces of the collar body comprise one or more decorative features.

4. The food and beverage bottle assembly of claim 1, wherein the food composition is selected from the group consisting of chocolate, cheese, spreads, breads, cookies, hard candy, and fudge.

5. The food and beverage bottle assembly of claim 1, wherein the food composition is chocolate.

6. The food and beverage bottle assembly of claim 1, wherein the food composition is cheese.

7. The food and beverage bottle assembly of claim 1, wherein the protective packaging comprises at least one graphical design.

8. The food and beverage bottle assembly of claim 1, wherein the protective packaging comprises a material selected from the group consisting of foil, polymer film, wax paper, cardboard, paper, and plastic.

* * * * *